United States Patent [19]

Ratzel et al.

[11] Patent Number: 4,477,753

[45] Date of Patent: Oct. 16, 1984

[54] SAFETY INTERLOCK FOR AN ELECTRIC POSITIONING SYSTEM

[75] Inventors: Rüdiger Ratzel, Bühl; Erich Schneider, Kirchheim, both of Fed. Rep. of Germany

[73] Assignee: Robert Bosch GmbH, Stuttgart, Fed. Rep. of Germany

[21] Appl. No.: 415,351

[22] Filed: Sep. 7, 1982

[30] Foreign Application Priority Data

Sep. 10, 1981 [DE] Fed. Rep. of Germany ....... 3135888

[51] Int. Cl.³ .............................................. G05B 9/02
[52] U.S. Cl. ....................................... 318/563; 361/30
[58] Field of Search ..................... 318/563; 361/30, 31

[56] References Cited

U.S. PATENT DOCUMENTS 3,914,675 10/1975 Konrad ............................. 361/30 X
4,146,801  3/1979 Vali et al. ........................ 318/563 X
4,388,571  6/1983 Tada et al. ....................... 318/563 X Primary Examiner—B. Dobeck
Attorney, Agent, or Firm—Frishauf, Holtz, Goodman & Woodward

[57] ABSTRACT

A logic circuit (34) is provided for preventing the application of energizing voltage to a positioning motor in the case of a circuit failure in the drivers stage of a control system. An equality gate provides a signal to each AND gate corresponding to a failure detection criterion whenever signals of the same level are present at the respective transistors controlling operation of the motor into opposite directions. At one AND gate a signal is provided if either of the transistors is conducting, indicating a failure if there is no control signal. At the other AND gate a signal is provided if either terminal of the motor is connected to energizing potential, likewise indicating a failure if no control signal at a transistor input is present. If either AND gate responds the equivalent of a control signal is applied to a pair of diodes to both of the transistor inputs, thereby blocking the motor.

6 Claims, 1 Drawing Figure

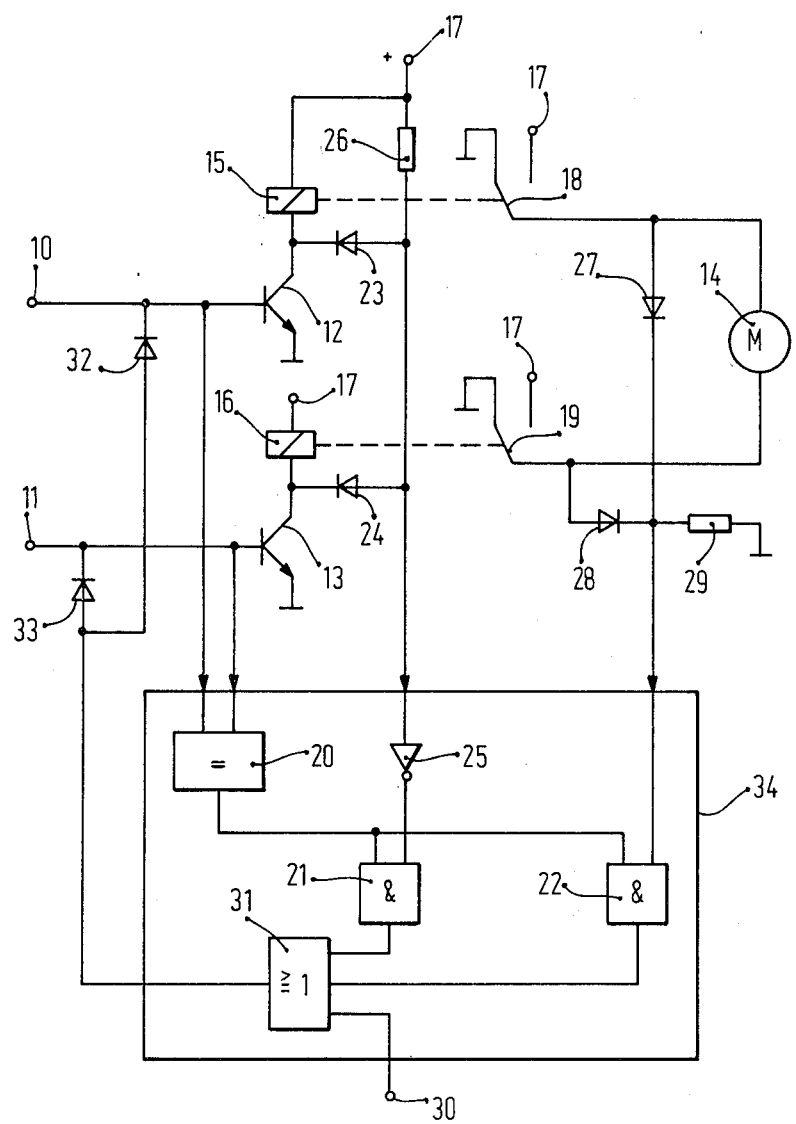

SAFETY INTERLOCK FOR AN ELECTRIC POSITIONING SYSTEM

This invention concerns a system for shifting the position of an object of considerable bulk to a predetermined position defined by electric coordinate signals by means of reversible electric motors positioning the object in one or more dimensions. More particularly the invention concerns disabling the motor to avoid damage to it and to avoid waste of energy when a defect in the drive stage exists, such as a welded relay contact or a burnt out transistor.

It is common in electric motor positioning systems, particularly those which are controlled by positioning data stored in a memory, but even in other positioning systems utilizing an electronic circuit for determining when and for how long each positioning motor should be driven and in what direction (forward or reverse), to utilize transistor switches to respond to the low level control signals for causing the appropriate terminals of the motor to be connected in the correct sense to the terminals of a DC source. Failures in this part of the positioning system are particularly troublesome, because the full power of the DC source capable of driving the motor may be uselessly dissipated or dangerously short-circuited in the case of such a failure.

A safety provision for shutting off a positioning motor in the case of a circuit failure is disclosed in German Published Patent Application DE-OS Nos. 27 34 264 and 28 18 806 which deal with producing various displacement movements for a motor vehicle seat by electrical positioning motors. As a safety measure in these cases, when the motor operates below a minimum permissible seat displacement velocity while a displacement command is at the same time present, a safety shut off of the positioning motor takes place. This system is on the one hand relatively expensive, since signals must be differentiated to indicate velocity and a threshold stage must be provided which must be fitted for operation under varying temperature and voltage conditions. On the other hand, for this system to operate a displacement movement must be under way before it can be recognized as a false one when the failure produces a false movement.

THE INVENTION

It is an object of this invention to prevent the motor from being energized in the case of a failure in the circuit for causing the motor to respond to control signals, such as a short-circuit caused by a burnt out transistor where a conductive alloying through between two electrodes takes place, or relay contacts weld together or even if a similar short circuit occurs because of damaged wiring insulation.

Briefly, a logic circuit is provided for causing the operation of the motor to be blocked when at the same time there are no control signals at the input of either of the transistors operating a positioning motor and the output of at least one of the transistors is substantially inconsistent with the absence of control signals. In another aspect of the invention the same or another logic circuit is provided in a manner capable of blocking the operation of the motor in the absence of a control signal at either terminal when at the same time a terminal of the motor is connected to energizing potential.

In a particularly advantageous form of the invention the absence of a control signal at either transistor input is detected by an equality gate and the other condition for blocking the motor is detected by appropriate diode circuits, while an AND gate responds when both conditions for blocking the motor are present, in such case applying, through another set of diodes, the equivalent of a control signal on both transistor inputs, causing both terminals of the motor to be connected to the same potential for blocking operation of the motor. The equality gate does not change its state under such conditions and only curing of the defect will restore operations. When both features of the invention are used an OR gate can be used for applying the equivalent of a control signal to both transistor inputs for blocking the motor in response to either of the pairs of conditions above set forth.

The invention has the advantage that by a relatively simple failure detecting logic circuit a failure can be recognized before the energization of a positioning motor, thus preventing the motor from even being put into motion. A false operation of a positioning motor can thus be excluded, as well waste of energy and possible damage to components.

DRAWING

The invention is further described by way of illustrative example with reference to the annexed drawing, in which the single FIGURE is a block diagram of a circuit containing a safety interlock according to the invention useful in the operation of an electric positioning system for a motor vehicle seat.

DESCRIPTION OF THE ILLUSTRATED EMBODIMENT

The motor control system shown in the drawing for purposes of illustration may be considered as one in which the circuit shown is used to provide a safety interlock in a system of the kind shown in our copending application Ser. No. 415,435 filed Sept. 7, 1982 now abandoned, in which the output of a comparator that determines in which direction the motor is to be driven is to provide a positive signal at one output when the motor is to be driven in one direction and to provide a positive signal at another output when the comparator output is of the opposite sign, which is to say when the motor is to be driven in the opposite direction.

The outputs of such a system are respectively provided to the input terminals 10 and 11 of the present system, where control signals for operating the motor in one direction (terminal 10) or the other (terminal 11) are received from time to time. The terminals 10 and 11 for the incoming control signals are connected respectively with the bases of two control transistors 12 and 13 for providing, alternatively, control signals for turning the motor 14 to the left or to the right.

The emitters of the two transistors 12 and 13 are both connected to ground (or chassis, in the case of a motor vehicle) and their collectors are respectively connected through relay winding 15 and 16 to a terminal 17 connected to the positive pole of a voltage supply source, the other pole of which is grounded. The two transfer switches 18 and 19 are respectively controlled by the relay windings 16 and 17 for connecting the two terminals of the positioning motor 14, respectively, either to ground or to the positive terminal 17. The circuit as so far described corresponds to the system disclosed in the above-cited references for operating a motor in response to control signals supplied by a control loop which can, for example, for vehicular purposes, particularly conveniently include or be constituted by a microprocessor.

For the purposes of the invention, the control signals at the terminals 10 and 11 are also supplied to the respective inputs of an equivalence gate 20 the output of which respond when the signals at both inputs are substantially the same. The output of the equivalence gate 20 is supplied to one input of each of the two AND gates 21 and 22. The collectors of the respective transistors 12 and 13 are each connected through the cathode-anode path of a diode, 23, 24, to the input of a common inverter 25 which provides its output to an additional input of the AND gate 21. The input of the inverter 25 is also connected through a resistor 26 with the positive voltage supply terminal 17.

The two terminals of the positioning motor 17 are respectively connected through the anode-cathode paths of two more diodes 27, 28 to an additional input of the AND gate 22 and also through a resistance 29 to ground. The outputs of the two AND gates 21 and 22 and also an additional terminal 30 are connected to the three inputs of an OR gate 31, the output of which is provided respectively through two more diodes 32 and 33 to the two terminals 10 and 11. The components 20, 21, 22, 25, 31 together constitute a failure detection logic circuit 34.

The manner of operation of the illustrated circuit according to the invention contemplates that upon occurence of a control signal, for example at the terminal 10, the transistor 12 will become conducting, causing the relay winding 15 to be energized to switch over the transfer switch 18 from the position shown in the drawing to its other position. In consequence the positioning motor 14 is connected to the positive voltage terminal 17 through the switch 18 and begin to carry out a positioning movement. A movement of the positioning motor 14 in the other direction is correspondingly produced when a control signal appears at the terminal 11. The operation of the failure detection logic circuit will now be described in the next paragraph.

It must be understood that in the absence of any control signal at one of the terminals 10 and 11, both transistors must be non-conducting, so that their respective collectors provide a positive 1-signal. This 1-signal produces a 0-signal at the output of the inverter 25, causing the AND gate 21 to remain blocked. If now, as a result of a burnout or some other malfunction, one of the transistors 12 and 13 should be in its conducting condition, a 1-signal will be produced at the output of the inverter 25. If at the same time no signal is present at either of the terminals 10 and 11, a 1-signal will also appear at the output of the equivalence gate 20, so that the AND gate 21 will respond and produce a 1-signal at both of the terminals 10 and 11 through the OR gate 31 and the diodes 32 and 33. In consequence the second transistor 12 or 13, which did not have the burnout or other failure, will now be made conducting and operation of the positioning motor is therefore prevented, since both terminals of the motor are now connected with the terminal 17. This condition persists, since the output signal at the equivalence gate 20 does not change when the 1-signal is applied to both of the terminals 10 and 11. Only after replacement of the damaged transistor will the original condition of the circuit be restored.

The logic circuit 34 also checks whether in the absence of any control signal at either of the terminals 10 and 11 both of the switches 18 and 19 connect the motor to ground. If this check is successful, a 0-signal is supplied to the AND gate 22 over both diodes 27 and 28 and the AND gate 22 remains blocked. If now, while there is no control signal at either of the terminals 10 or 11, so that the equivalence gate 20 provides a 1-signal to the AND gate 22, a failure occurs such as a welded contact bridge connecting the arm of one of the switches 18 and 19 to the terminal 17, a 1-signal will be produced at the output of the AND gate 22 as the result of which, in the manner already described, a control signal will be applied to both of the input terminals 10 and 11 to prevent operation of the positioning motor.

Of course not only direct failures in the control transistors 12 and 13 or in the switches 18 and 19 can be found by the failure detection logic circuit, but also failures caused by malfunctioning signal conductors that in turn cause a corresponding switching condition of one of the transistors 12 or 13 or one of the switches 18 or 19.

The very simply represented failure detection logic circuit can also be constituted by a microprocessor, for example, that can provide for the corresponding logical inter-relations. Furthermore, instead of the coarse distinction between 1 and 0 signal levels, this recognition can also take place through "window" comparators, which can also be constituted by a micro-processor function.

The terminal 30 provides for further possibilities for blocking the operation of the positioning motor 14 through the error detection logic circuit 34, either by manual actuation for disabling the positioning motor or by other automatic safety devices.

Although the invention has been described with reference to a particularly illustrative example, it will be understood that modifications and variations are possible within the inventive concept.

We claim:

1. Safety interlock circuit for an electromechanical positioning drive operated by means of an electric motor having terminals connectable selectively to the poles of a d.c. source for forward and for reverse movement under control by a pair of transistor switches, said circuit comprising a logic circuit (34) having inputs connected respectively to the control electrodes of said transistor, an input connected through diodes respectively to the output electrodes of said transistor, and an output connected for blocking the operation of said motor in the absence of a control signal at the control electrodes of either of said transistors if at the same time the output of at least one of said transistors is substantially inconsistent with the absence of control signals.

2. Interlock circuit as defined in claim 1 in which each of said transistors is nonconducting when no control signal is provided at the transistor control electrode, an equivalence gate in said logic circuit for indicating the absence of a control signal at either of said transistor control electrodes, an AND gate with said diodes respectively connecting one terminal of said AND gate to the output electrodes of said transistors, is provided for detecting when at least one of said transistors is conducting while no control signal is present, and the output of said AND gate is connected to apply the equivalent of a control signal to the control electrodes of both transistors respectively through a second pair of diodes for blocking the activation of said motor when said AND gate responds.

3. Interlock circuit as defined in claim 1 or claim 2 in which relays having contacts in circuit with said motor are provided for operation by said transistors and in which said logic circuit (34) is also constituted to block operation of said motor when, in the absence of a control signal at the input of either of said transistors, either of the terminals of said motor is connected by one of said relays to energizing potential, said logic circuit having for that purpose an input connection connected through respective diodes to the said terminals of said motor.

4. Safety interlock circuits for an electromechanical positioning drive operated by means of an electric motor having terminals connectable selectively to the poles of a d.c. source for forward and for reverse movement, by relay contacts controlled by a pair of transistor switches, said circuit comprising a logic circuit (34) having inputs connected respectively to the control electrodes of said transistors and an input connected through respective diodes to said terminals of said motor, for blocking operation of said motor, in the absence of a control signal at the control electrode of either of said transistors if at the same time a terminal of said motor is connected to energizing potential through contacts of either of said relays.

5. Interlock circuit as defined in claim 1 in which an equivalence gate is provided in said logic circuit (34) for indicating the absence of a control signal at either of said transistor control electrodes, an AND gate connecting to said motor terminals through said diodes is provided for detecting when at least one of said motor terminals is conected to energizing potential and the output of said AND gate is connected to apply the equivalent of a control signal to the control electrodes of both said transistors respectively through a second pair of diodes for blocking the activation of said motor when said AND gate responds.

6. Interlock circuit as defined in claim 5 in which said transistors are both nonconducing when no control signal is present at the transistor input and in which said logic circuit has an input connected through diodes respectively to the output electrode of said transistors and also has a second AND gate connected so as to block operation of said motor when in the absence of a control signal at the control electrode of either of said transistors, one of said transistors shows by the potential of its output electrode that it is in the conducting state.

* * * * *